US010641190B2

(12) United States Patent
Gruber et al.

(10) Patent No.: US 10,641,190 B2
(45) Date of Patent: May 5, 2020

(54) METHOD FOR OPERATING A SPARK IGNITED ENGINE

(71) Applicant: INNIO Jenbacher GmbH & Co OG, Jenbach (AT)

(72) Inventors: Friedrich Gruber, Hippach (AT); Nikolaus Spyra, Innsbruck (AT); Christian Trapp, Hall in Tirol (AT); Georg Tinschmann, Schwaz (AT); Ettore Musu, Modena (IT); Peter Christiner, Graz (AT)

(73) Assignee: INNIO JENBACHER GMBH & CO OG, Jenbach (AT)

( * ) Notice: Subject to any disclaimer, the term of this patent is extended or adjusted under 35 U.S.C. 154(b) by 41 days.

(21) Appl. No.: 14/930,043

(22) Filed: Nov. 2, 2015

(65) Prior Publication Data
US 2016/0177851 A1 Jun. 23, 2016

(30) Foreign Application Priority Data

Dec. 19, 2014 (AT) .................................. A 924/2014

(51) Int. Cl.
| F02D 41/00 | (2006.01) |
| F02D 35/02 | (2006.01) |
| F02D 19/08 | (2006.01) |
| F02B 19/10 | (2006.01) |
| F02B 1/02 | (2006.01) |
| F02B 19/12 | (2006.01) |
| F02D 19/06 | (2006.01) |

(52) U.S. Cl.
CPC ...... *F02D 41/0027* (2013.01); *F02B 19/1085* (2013.01); *F02D 19/081* (2013.01); *F02D 35/023* (2013.01); *F02D 35/028* (2013.01); *F02D 41/005* (2013.01); *F02D 41/006* (2013.01); *F02D 41/0025* (2013.01); *F02D 41/0077* (2013.01); *F02B 1/02* (2013.01); *F02B 19/12* (2013.01); *F02D 19/0642* (2013.01); *Y02T 10/36* (2013.01); *Y02T 10/47* (2013.01)

(58) Field of Classification Search
CPC ............... F02D 41/0027; F02D 35/023; F02D 41/0025; F02D 41/005; F02D 41/006; F02D 35/028; F02D 41/0077; F02D 19/081; F02D 19/0642; F02B 19/1085; F02B 1/02; F02B 19/12; Y02T 10/47; Y02T 10/36
See application file for complete search history.

(56) References Cited

U.S. PATENT DOCUMENTS

| 4,892,070 A | 1/1990 | Kuhnert | |
| 5,086,031 A * | 2/1992 | Deller | B01J 21/08 |
| | | | 502/232 |
| 5,787,864 A * | 8/1998 | Collier, Jr. | F02M 21/0215 |
| | | | 123/436 |
| 6,032,617 A | 3/2000 | Willi et al. | |
| 6,041,591 A * | 3/2000 | Kaneko | F02D 41/024 |
| | | | 123/300 |
| 6,230,683 B1 * | 5/2001 | zur Loye | F02B 1/12 |
| | | | 123/27 GE |
| 6,436,354 B1 * | 8/2002 | Priegnitz | B01J 8/0453 |
| | | | 422/198 |
| 6,463,907 B1 | 10/2002 | Hiltner | |
| 6,550,430 B2 | 4/2003 | Gray | |
| 6,820,587 B1 * | 11/2004 | Hoglund | F02B 23/0645 |
| | | | 123/294 |
| 6,912,992 B2 | 7/2005 | Ancimer et al. | |
| 7,007,669 B1 * | 3/2006 | Willi | F02D 13/0269 |
| | | | 123/305 |
| 7,036,482 B2 | 5/2006 | Beck et al. | |
| 7,191,772 B2 | 3/2007 | Robitschko et al. | |
| 7,398,743 B2 | 7/2008 | Fiveland | |
| 7,757,659 B2 | 7/2010 | Kurotani et al. | |

(Continued)

FOREIGN PATENT DOCUMENTS

| AT | 5134 U1 | 3/2002 |
| AT | 414265 B | 10/2006 |

(Continued)

OTHER PUBLICATIONS

John B. Heywood, "Internal Combustion Engine Fundamentals", New York, 1988, McGraw-Hill, XP002758565.
Extended European Search Report dated Jul. 6, 2016 in corresponding European Patent Application No. 15 00 3056 (English translation).
Austrian Search Report dated Jun. 29, 2015 in corresponding Austrian Patent Application No. 924/2014 (with English translation).
Notification of Reason for Refusal issued in connection with corresponding KR Application No. 1020150171371 dated Mar. 7, 2017.

(Continued)

*Primary Examiner* — Hung Q Nguyen
*Assistant Examiner* — Brian P Monahon
(74) *Attorney, Agent, or Firm* — Fletcher Yoder, P.C.

(57) ABSTRACT

A method for operating a spark ignited engine, including forming a combustible mixture by mixing generally homogeneously a first fuel and air and introducing this mixture into the at least one cylinder in an intake stroke, and compressing the combustible mixture with a piston in a compression stroke thereby introducing a part of the combustible mixture into a pre-chamber. During the intake and/or the compression stroke, a second fuel is introduced into the pre-chamber at an introduction-time before start of combustion, and the second fuel is of the same or different chemical composition and/or concentration with respect to the first fuel, and a spark ignites in the prechamber. An amount of second fuel and/or the chemical composition of second fuel introduced to the pre-chamber and/or spark timing of the pre-chamber and/or an in-cylinder charge temperature is chosen such that a desired duration of combustion can be achieved.

16 Claims, No Drawings

(56) References Cited

U.S. PATENT DOCUMENTS

| | | | |
|---|---|---|---|
| 7,922,551 B2* | 4/2011 | Tozzi | F02B 19/08 123/169 EL |
| 2001/0017123 A1* | 8/2001 | Raab | F02B 1/12 123/305 |
| 2007/0204813 A1* | 9/2007 | Arai | F02D 19/081 123/25 A |
| 2008/0000445 A1* | 1/2008 | Kim | F02D 41/0025 123/295 |
| 2008/0032245 A1* | 2/2008 | Bushnell | F23D 11/402 431/11 |
| 2008/0168963 A1* | 7/2008 | Gagliano | F02B 19/1014 123/267 |
| 2008/0178848 A1* | 7/2008 | Duffy | F02D 41/0065 123/481 |
| 2009/0012698 A1* | 1/2009 | Shinagawa | F02B 23/0672 701/103 |
| 2009/0024306 A1* | 1/2009 | Bromberg | F02D 19/081 701/103 |
| 2009/0043479 A1* | 2/2009 | Noda | F02D 13/02 701/103 |
| 2009/0230351 A1* | 9/2009 | Nagatani | B82Y 30/00 252/182.32 |
| 2009/0309475 A1* | 12/2009 | Tozzi | F02B 19/08 313/143 |
| 2009/0319156 A1* | 12/2009 | Fujikawa | F02B 23/104 701/103 |
| 2010/0222985 A1* | 9/2010 | Yun | F02D 37/02 701/103 |
| 2011/0082604 A1* | 4/2011 | Lam | B64G 1/26 701/4 |
| 2011/0288742 A1* | 11/2011 | Wermuth | F02D 35/02 701/102 |
| 2012/0103302 A1 | 5/2012 | Attard | |
| 2012/0118267 A1* | 5/2012 | Kang | F02D 13/0207 123/406.26 |
| 2012/0160221 A1* | 6/2012 | Munshi | C10L 3/06 123/575 |
| 2012/0173125 A1 | 7/2012 | Baumgarten et al. | |
| 2013/0055985 A1 | 3/2013 | Gruber et al. | |
| 2013/0179050 A1* | 7/2013 | Munshi | F02B 43/10 701/104 |
| 2013/0206101 A1* | 8/2013 | Douglas | H01T 13/46 123/260 |
| 2013/0236371 A1* | 9/2013 | Maslov | F02C 3/20 422/198 |
| 2014/0245974 A1* | 9/2014 | Elsarrag | F01N 5/025 123/3 |
| 2015/0176534 A1* | 6/2015 | Malm | F23N 1/025 123/445 |

FOREIGN PATENT DOCUMENTS

| | | |
|---|---|---|
| CN | 101363372 | 2/2009 |
| CN | 101421500 A | 4/2009 |
| CN | 103958865 A | 7/2014 |
| EP | 1 446 564 A1 | 8/2004 |
| JP | H07180645 A | 7/1995 |
| JP | H10-502717 A | 3/1998 |
| JP | 2000-220484 A | 8/2000 |
| JP | 2001-020784 A | 1/2001 |
| JP | 2002-276519 A | 9/2002 |
| JP | 2004-332659 A | 11/2004 |
| JP | 2005-307789 A | 11/2005 |
| JP | 2008-025374 A | 2/2008 |
| JP | 2013-209967 | 10/2013 |
| JP | 2016-75275 | 5/2016 |
| JP | 2016-75278 | 5/2016 |
| JP | 2016-128685 | 7/2016 |
| WO | 2001059280 A1 | 8/2001 |
| WO | 2001086127 A2 | 11/2001 |
| WO | 2004057167 A1 | 7/2004 |
| WO | 2010149362 A1 | 12/2010 |

OTHER PUBLICATIONS

Machine Translation and First Office Action and Search issued in connection with corresponding CN Application No. 201510979085.7 dated Jan. 31, 2018.

Notification of Reasons for Refusal issued in connection with corresponding JP Application No. 2015-237287 dated May 8, 2018.

Machine Translation and Notice of Final Rejection issued in connection with corresponding KR Application No. 1020150171371 dated Nov. 8, 2017.

Machine Translation and Notice of Final Rejection issued in connection with corresponding KR Application No. 1020150171371 dated Jan. 29, 2018.

\* cited by examiner

METHOD FOR OPERATING A SPARK IGNITED ENGINE

The present invention is directed to a method for operating a spark ignited engine with the features of the preamble of claim 1 and to a spark ignited engine with the features of the preamble of claim 13.

When designing a spark ignited engines there are conflicting requirements between the reduction of different types of emissions like nitrogen oxides (NOx), unburnt hydrocarbons (HC), and carbon monoxide (CO).

A promising approach to realize highly efficient and low emission combustion is the HCCI-concept (homogeneous charge compression ignition). Here, the ignition of a highly diluted (lean and/or with high rate of exhaust recirculation, EGR) and homogeneous fuel-air-mixture is effected through the temperature increase during the compression stroke close to the upper dead center of the piston. The very dilute fuel-air-mixture allows combustion with extremely low values for nitrogen oxides (NOx).

Auto-ignition of the fuel-air-mixture in the combustion chamber is achieved through a combination of various measures, as for example a high geometric compression ratio $\epsilon$ and pre-heating of the charge through suitable measures (for example pre-heating of the intake air or exhaust gas recirculation, EGR). As according to the HCCI combustion concept the fuel-air-mixture ignites more or less simultaneously in the whole combustion chamber close to top dead center, the combustion event is extremely rapid.

There are several problems connected with the HCCI concept. Combustion is hard to control. A second fuel with different auto-ignition properties compared to the first fuel is a known concept to improve controllability. This of course has the disadvantage of requiring the handling of a second fuel.

In contrast, in spark ignited engines the combustion timing can be easily controlled by the spark timing. In large spark ignited engines (typically with cylinder bores of 150 mm and more) prechambers are provided in which ignition is initiated.

Also known from prior art are concepts to control prechamber type spark ignited engines. JP2013209967, for example, shows an active prechamber wherein the amount of fuel supplied to the prechamber can be controlled in order to prevent misfire.

It is the objective of present invention to disclose a method and a spark ignited engine which allows a high performance combustion and at the same time reduced emissions.

This object is accomplished by a method according to claim 1 and spark ignited engine according to claim 13. Further preferred embodiments are described in the dependent claims.

According to the invention it is provided that an amount of second fuel and/or the chemical composition of second fuel introduced to the pre-chamber and/or spark timing of the pre-chamber and/or an in-cylinder charge temperature is being chosen such that a desired duration of combustion can be achieved.

In other words, the prechamber and the in-cylinder charge temperature serve as a control means to achieve better performance and reduced emissions of the combustion event.

The invention can be carried out best if it is provided that a valve that is providing the introduction of air and/or second fuel into the prechamber can be actively and individually controlled for each prechamber provided in the engine.

The cylinder charge is composed of first fuel, second fuel, air and any residual gas present from previous cycles and possibly any gas added by external exhaust gas recirculation (EGR).

It has to be noted that due to the fluid connection between the prechamber and the main chamber, whenever we talk about "cylinder charge" what is meant is the charge of the combined volume of the main chamber and the prechamber.

It can be provided that the first fuel is natural gas or a mixture of natural gas and carbon dioxide (CO2) such that the amount of CO2 and methane (CH4) is higher than 80%.

It can be provided that the second fuel is natural gas or a combination of natural gas and a gas with H2 higher than 10%.

It can be provided that the in-cylinder charge temperature is controlled either by an internal EGR-rate (exhaust gas recirculation-rate) kept in the combustion chamber during gas exchange process or exhaust gas having been pushed out from the combustion chamber and having been re-introduced into the combustion chamber again, or by an external EGR rate recirculated in the intake system.

It can be provided that the in-cylinder charge temperature is controlled by influencing the intake temperature of air and/or first fuel.

For example it can be provided that the step of changing the temperature of the in-cylinder charge comprises lowering the temperature of the in-cylinder charge if the mechanical stress is too high. This can for instance be achieved through lowering the intake temperature of first fuel and intake charge. Intake charge is being understood as describing either a mixture of first fuel and air or air alone.

It can be provided that if the duration of combustion shall be increased the hydrogen amount in the second fuel is decreased, if the duration of combustion shall be decreased the hydrogen amount in the second fuel is increased.

It can be provided that if the duration of combustion shall be increased the in-cylinder charge temperature is decreased, if the duration of combustion shall be decreased the in-cylinder charge temperature is increased.

It can be provided that spark timing for igniting the prechamber is in a range of 30° CA BTDC (crank angle before top dead center) to TDC (corresponding to 0° CA)

It can be provided that if the duration of combustion shall be increased the spark timing is retarded, if the duration of combustion shall be decreased the spark timing is advanced.

It can be provided that the introduction time of the second fuel is chosen between 400° to 40° before firing TDC, a lambda value of larger than 1.6, preferably larger than 1.9, an EGR rate between 0-40%, the amount of second fuel is chosen between 0.5% to 15% with respect to the energy content of the combustible mixture, the mixture temperature at intake of cylinder is chosen between 50-130° C., preferably between 70-100° C.

The numbers for crank angles given here by way of example are valid for a 4-stroke engine. The invention is by no way limited to a 4-stroke engine. For example, the invention can also be operated on a 2-, 5- or 6-stroke engine.

It can be provided that the introduction time of the second fuel is chosen between 400° to 40° before firing TDC, a lambda value of larger than 2.0, preferably larger than 2.2, an EGR rate between 0-40%, the amount of second fuel is chosen between 0.5% to 15% with respect to the energy content of the combustible mixture, the mixture temperature at intake of cylinder is chosen between 70-130° C.

It can be provided that
a brake mean effective pressure is between 16 and 28 bar,
a compression ratio is between 10 and 14 and, an intake valve closing at 1 millimeter lift is between 30 degrees before bottom dead center and 30 degrees after bottom dead center during the intake stroke.

The inlet temperature of the fuel-air-mixture can be influenced through intervention on the charge air cooler and/or changes of the EGR rate.

With respect to emissions it can be noted that according to the inventive method:

NOx emissions are very low because a very high air-fuel-ratio (very lean mixture) can be used which would not be possible in a conventional spark-ignited engine, for example. It is also important that both the first and the second fuel are pre-mixed with air or cylinder charge before the start of combustion CO and HC emissions are low because combustion is fast and finishes close to the top dead center and temperature of the cylinder charge is high.

Soot emissions are low because both the first and the second fuel are pre-mixed with air or cylinder charge.

The benefits of the present invention seem to be due to the fact that the duration of combustion is much shorter than in the prior art for very lean mixtures. This combination is not achieved in the prior art. It is well-known that a fast combustion in connection with a lean mixture gives high efficiency.

As already stated by choosing a temperature of the cylinder charge the invention provides the possibility to influence the duration of combustion.

By choosing a higher temperature of the cylinder charge the duration of combustion can be shortened thus producing less unburnt hydrocarbons and CO and resulting in a higher efficiency of the engine. Thus the invention combines low emission with a high efficiency.

In the following the terms "duration of combustion" and "center of gravity" (of combustion) are being used. Duration of combustion, also "burn duration" is a measure of the burn progress in a combustion cycle, expressed as mass fraction burned during a certain crank angle. For example, the burn duration of $\Delta\theta_{0-10\%}$ of 15° crank angle means that 10% of the charge mass has burned during 15° crank angle revolution.

The combustion center of gravity indicates the state in which half of the fresh charge is burned. It is also known as MFB50, i.e. 50% mass fraction burned.

The terms can be found in textbooks on internal combustion engines, see in particular Heywood, John B., Internal Combustion Engine Fundamentals, New York, McGraw-Hill, 1988.

The center of gravity of combustion influences efficiency of the engine and amount of emissions of the engine.

Particularly preferred is the embodiment, whereby the center of gravity of combustion (when half of the total energy has been released in the combustion) is tuned to 5-7°—after the upper dead center. To determine the center of combustion the crank angle position of the peak firing pressure can be used.

With respect to gases all numbers given in % relate to volume percentage.

It should be understood, that the amount and/or the chemical composition of the second fuel introduced into the prechamber which both influence the center of gravity of the combustion should be chosen such that a desired efficiency of the engine can be achieved and amount of emissions and mechanical stress are within an acceptable range. This can be achieved by having the center of gravity of combustion rather early, e.g. 0 to 15° crank angle after firing top dead center (aTDC).

The first fuel and second fuel can be chosen as said before. To start with, a broad parameter set is defined. For example:

Second fuel introduction timing into the prechamber 400° to 40° BEFORE FIRING TDC Charge composition with excess of air and EGR, lambda larger than 1.6 and EGR ranges from 0-40%, either internal or external cooled/uncooled EGR amount of second fuel 0.1-15% based on energy content Mixture temperature at intake of cylinder 50-130° C.

From the above broad parameter set choose an initial set of parameters depending on the type of the given engine (size of engine, rpm of the engine, geometric compression ratio), available types of fuels.

As a second step, premix the chosen first fuel and air to achieve a homogenous combustible mixture at a desired lambda. The combustible mixture should be dilute (lambda should be high) to achieve low NOx emissions. There are different ways this can be done, e.g. by way of a carburetor or a gas mixer or with a port injection valve or with a gas injector directly in the combustion chamber.

Choose specific parameters out of the broad set of parameters and run the engine. Measure efficiency of the engine, amount of emissions (NOx and HC, preferably also CO), center of gravity of combustion and duration of combustion. Center of gravity of combustion and duration of combustion can e.g. be inferred by measuring the time variation of the in-cylinder-pressure. This is known to the skilled person.

If efficiency of the engine and amount of emission is already within a desired range keep the initial set of parameters.

If duration of combustion is too long (i.e. efficiency is too low and/or emissions are too high, in particular HC-emissions), e.g. duration is longer than 30 to 40 degrees crank angle independently of rpm of the engine, increase the temperature of the cylinder charge (e.g. by increasing intake temperature of the mixture and/or increasing residual gases in the cylinder) and/or the amount of second fuel keeping in mind that the higher the temperature of the cylinder charge the lesser amount of second fuel is required and vice versa.

Continue to run the engine again with the changed temperature and check duration of combustion with regard to efficiency of the engine and emissions. If duration of combustion is still too long, increase temperature of combustible mixture and/or the amount of second fuel.

If duration of combustion is now too short (efficiency and emissions are fine but peak pressure in cylinder is too high and/or pressure rise rate is too steep) decrease the temperature of the cylinder charge and/or the amount of second fuel.

Iterate this procedure until duration of combustion is within a desired range. Cylinder peak pressure and pressure gradients are suitable indicators for mechanical stresses to the engine, high peak pressure and large gradients meaning high mechanical load.

A narrower set of parameters could look as follows:

Second fuel introduction into the prechamber timing 400° to 40° BEFORE FIRING TDC Mixture with excess of air and EGR, lambda between 2.3 and 2.6 or 2.6 and 2.9, and internal EGR ranges from 3-20%, amount of second fuel 1-7% based on energy content Mixture temperature at intake of cylinder 70-100° C.

It is preferred that the brake mean effective pressure is between 14 and 26 bar, the compression ratio is between 10 and 14 and the intake valve closing at 1 millimeter lift is between 30 degrees before bottom dead center and 30 degrees after bottom dead center during the intake stroke.

It can be provided with respect to all embodiments that the feature wherein an amount of second fuel and/or the chemical composition of second fuel introduced to the pre-chamber and/or spark timing of the pre-chamber and/or an in-cylinder charge temperature is being chosen such that a desired duration of combustion can be achieved, can applied during combustion operation.

The invention claimed is:

1. A method for operating a spark ignited engine, the spark ignited engine having at least one cylinder, a piston movable in the at least one cylinder, and at least one pre-chamber connected to the at least one cylinder, the method comprising the steps of:
forming a combustible mixture by mixing generally homogeneously a first fuel and air;
introducing the combustible mixture into the at least one cylinder during an intake stroke;
compressing the combustible mixture with the piston during a compression stroke thereby introducing a part of the combustible mixture into the at least one pre-chamber;
introducing during the intake stroke and/or the compression stroke a second fuel comprising natural gas into the at least one pre-chamber at an introduction-time before start of combustion, with the second fuel being of a different chemical composition and/or concentration with respect to the first fuel;
igniting by spark the combustible mixture and the second fuel in the at least one pre-chamber;
selecting an amount of the second fuel, a chemical composition of the second fuel introduced into the at least one pre-chamber, a timing of igniting by spark in the at least one pre-chamber, and an in-cylinder charge temperature based on a duration of combustion desired;
measuring engine efficiency, amount of emissions, center of gravity and duration of combustion; and
increasing the in-cylinder charge temperature to within a range of 50 to 130° C. in response to a combustion duration longer than 40 degrees crank angle independent of an rpm of the engine or
decreasing the in-cylinder charge temperature to within the range of 50 to 130° C. in response to the combustion duration being less than a desired combustion duration.

2. The method according to claim 1, wherein the first fuel is natural gas or a mixture of natural gas and $CO_2$, such that an amount of $CO_2$ and $CH_4$ in the first fuel is higher than 80%.

3. The method according to claim 1, wherein the second fuel is a combination of natural gas and a gas with a $H_2$ content higher than 10%.

4. The method according to claim 1, wherein the in-cylinder charge temperature is controlled either by an internal exhaust gas recirculation rate through a combustion chamber during a gas exchange process, or by an external exhaust gas recirculation rate through an intake system.

5. The method according to claim 1, wherein the in-cylinder charge temperature is controlled by affecting an intake temperature of air and/or the first fuel.

6. The method according to claim 1, wherein a $H_2$ content of the second fuel is decreased to increase the duration of combustion, and the $H_2$ content of the second fuel is increased to decrease the duration of combustion.

7. The method according to claim 1, wherein the in-cylinder charge temperature is decreased to increase the duration of combustion, and the in-cylinder charge temperature is increased to decrease the duration of combustion.

8. The method according to claim 1, wherein the timing of igniting by spark the pre-chamber is in a range of a 30 degree crank angle before top dead center to a 0 degree crank angle at top dead center.

9. The method according to claim 8, wherein the timing of igniting by spark is retarded to increase the duration of combustion, and the timing of igniting by spark is advanced to decrease the duration of combustion.

10. The method according to claim 1, wherein the introduction-time of the second fuel is between a 400 degree crank angle to a 40 degree crank angle before firing at top dead center, a lambda value of larger than 1.6, an emission gas recirculation rate between 0 to 40%, the amount of second fuel is between 0.5% to 15% with respect to an energy content of the combustible mixture, and a temperature of the combustible mixture at intake of the at least one cylinder is between 50 to 130° C.

11. The method according to claim 1, wherein the introduction-time of the second fuel is between a 400 degree crank angle to a 40 degree crank angle before firing at top dead center, a lambda value of larger than 2.0, an emission gas recirculation rate between 0 to 40%, the amount of second fuel is between 0.5% to 15% with respect to an energy content of the combustible mixture, and a temperature of the combustible mixture at intake of the at least one cylinder is between 70 to 130° C.

12. The method according to claim 1, wherein a brake mean effective pressure is between 16 and 28 bar, a compression ratio is between 10 and 14, and an intake valve closing at 1 millimeter lift is between 30 degrees before bottom dead center and 30 degrees after bottom dead center during the intake stroke.

13. A spark ignited engine comprising at least one cylinder with a pre-chamber connected to a main chamber, a piston moveable in the at least one cylinder, a valve operable to introduce a second fuel into the pre-chamber, and an electronic control unit, the spark ignited engine operable according to the method of claim 1.

14. The method according to claim 1, wherein the introduction time of the second fuel is between a 400 degree crank angle to a 40 degree crank angle before firing at top dead center, a lambda value of larger than 1.9, an emission gas recirculation rate between 0 to 40%, the amount of second fuel is between 0.5% to 15% with respect to an energy content of the combustible mixture, and a temperature of the combustible mixture at intake of the at least one cylinder is between 70 to 100° C.

15. The method according to claim 1, wherein the introduction time of the second fuel is between a 400 degree crank angle to a 40 degree crank angle before firing at top dead center, a lambda value of larger than 2.2, an emission gas recirculation rate between 0 to 40%, the amount of second fuel is between 0.5% to 15% with respect to an energy content of the combustible mixture, and a temperature of the combustible mixture at intake of the at least one cylinder is between 70 to 130° C.

16. A method for operating a spark ignited engine, the spark ignited engine having at least one cylinder, a piston movable in the at least one cylinder, and at least one pre-chamber connected to the at least one cylinder, the method comprising the steps of:
forming a combustible mixture by mixing generally homogeneously a first fuel and air;

introducing the combustible mixture into the at least one cylinder during an intake stroke;

compressing the combustible mixture with the piston during a compression stroke thereby introducing a part of the combustible mixture into the at least one pre-chamber;

introducing during the intake stroke and/or the compression stroke a second fuel comprising natural gas into the at least one pre-chamber at an introduction-time before start of combustion, with the second fuel being of a different chemical composition and/or concentration with respect to the first fuel;

igniting by spark the combustible mixture and the second fuel in the at least one pre-chamber;

selecting an amount of the second fuel, a chemical composition of the second fuel introduced into the at least one pre-chamber, a timing of igniting by spark in the at least one pre-chamber, and an in-cylinder charge temperature based on a duration of combustion desired;

measuring engine efficiency, amount of emissions, center of gravity and duration of combustion; and adjusting the amount of the second fuel in response to a combustion duration longer than 40 degrees crank angle independent of an rpm of the engine; or adjusting the amount of the second fuel in response to the combustion duration being less than a desired combustion duration.

\* \* \* \* \*